(12) United States Patent
Hey et al.

(10) Patent No.: US 6,826,187 B1
(45) Date of Patent: *Nov. 30, 2004

(54) INTERFACING BETWEEN A PHYSICAL LAYER AND A BUS

(75) Inventors: George Michael Hey, Redwood City, CA (US); Brian T. Mayo, Saratoga, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/307,094

(22) Filed: May 7, 1999

(51) Int. Cl.[7] .............................. H04J 3/02; H04L 12/66
(52) U.S. Cl. .................... 370/395.6; 370/401; 370/463; 370/469
(58) Field of Search ................................ 370/357, 359, 370/395.1, 419, 420, 463, 465, 469, 395.6, 401; 375/219, 220, 222

(56) References Cited

U.S. PATENT DOCUMENTS

| | | | | |
|---|---|---|---|---|
| 5,291,485 A | * | 3/1994 | Afify et al. | 370/77 |
| 5,388,102 A | * | 2/1995 | Griffith et al. | 370/512 |
| 5,548,587 A | * | 8/1996 | Bailey et al. | 370/60.1 |
| 5,784,370 A | | 7/1998 | Rich | |
| 5,889,778 A | * | 3/1999 | Huscroft et al. | 370/395.31 |
| 5,999,518 A | * | 12/1999 | Nattkemper et al. | 370/258 |
| 6,005,865 A | * | 12/1999 | Lewis et al. | 370/398 |
| 6,091,729 A | * | 7/2000 | Dove | 370/395 |
| 6,147,997 A | * | 11/2000 | Holden et al. | 370/395 |
| 6,167,063 A | * | 12/2000 | Ross | 370/512 |
| 6,188,692 B1 | * | 2/2001 | Huscroft et al. | 370/395 |
| 6,345,052 B1 | * | 2/2002 | Tse et al. | 370/395.6 |
| 6,345,310 B1 | * | 2/2002 | Allison et al. | 709/250 |

\* cited by examiner

*Primary Examiner*—Alpus H. Hsu
(74) *Attorney, Agent, or Firm*—Blakely, Sokoloff, Taylor & Zafman LLP

(57) ABSTRACT

A method and apparatus are described for interfacing between a physical layer (PHY) interface and a bus. For the receiver side, a downstream clock signal from a physical layer transceiver and a cell available signal in a first plurality of receiver signals from the PHY interface are received. Bus receiver signals to the bus and a second plurality of receiver signals to the PHY interface are generated using the downstream clock signal and the cell available signal. For the transmitter side, an upstream clock signal from a physical layer transceiver, first plurality of bus transmitter signals from the bus, and a cell available signal in a first plurality of PHY transmitter signals from the PHY interface are received. A second plurality of bus transmitter signals to the bus and a second plurality of PHY transmitter signals to the physical interface are generated using the upstream clock signal and the cell available signal.

74 Claims, 13 Drawing Sheets

TX STATE MACHINE INPUTS:

501

| P_1 FROM CLOCK/PULSE ENGINE |
| PHY_TX CLAV_Q (REGISTERED) |
| TERM_CNT |

TX STATE MACHINE OUTPUTS:

502

| STATE | PHY_TXSOC_D | PHY_TXEN_D# | TDM_TXSYNC_D | TDM_TXCLK_G (OPTIONAL) |
|---|---|---|---|---|
| $S_0$ | 0 | 1 | 0 | 0 |
| $S_1$ | 0 | 1 | 1 | 1 |
| $S_2$ | 0 | 1 | 0 | 1 |
| $S_3$ | 1 | 0 | 0 | 1 |
| $S_4$ | 0 | 0 | 0 | 1 |
| $S_5$ | 0 | 0 | 1 | 1 |
| $S_6$ | 0 | 0 | 0 | 1 |
| $S_7$ | 0 | 0 | 0 | 0 |

US 6,826,187 B1

INTERFACING BETWEEN A PHYSICAL LAYER AND A BUS

FIELD OF THE INVENTION

This invention relates to computer networks. In particular, the invention relates to interfacing between a physical layer and a bus.

THE BACKGROUND OF THE INVENTION

Technologies for computer networks have advanced at a fast rate to accommodate the needs for efficient and reliable communication. Designs for computer networks are now becoming complex both in hardware and software. To reduce complexity, most computer networks are organized as a series of layers or protocols, each one built upon the one below it. The function of each layer is to provide certain services to the higher layers, shielding those layers from the specific and detailed implementation of these services.

A network architecture typically follows some reference model to maintain universality and standardization. Examples of important reference models include the broadband Integrated Services Digital Network (B-ISDN) Asynchronous Transfer Mode (ATM), the Open System Interconnection (OSI), and the Transmission Control Protocol/Internet Protocol (TCP/IP) reference models. In general, a network architecture has the following layers: application, transport, network, data link, and physical. In these layers, the actual data transmission takes place in the physical layer.

For ATM communications systems, the Universal Test & Operations PHY Interface for ATM (UTOPIA) parallel data interface is an industry standard for communications between an upper ATM layer module and a Physical Layer (PHY) module. Thus, vendors providing particular physical layer transceivers often include the PHY layer UTOPIA interface as part of their chipset functionality. In its most compact form, the minimum number of lines connecting to the ATM layer is 8 control and clock lines plus the number of data bus lines (8 or 16) with a bi-directional data bus at the ATM layer. Thus, for a UTOPIA interface with an 8-bit wide data bus, the minimum number of electrical pin connections between the PHY and ATM layer is 16.

Embedded systems for telecommunications often incorporate processors with an on-board or on-chip Communications Processor Module (CPM) with flexible capabilities including ATM functionality. Some CPMs include UTOPIA interface functionality while others do not. Most provide pins that perform different functions, depending on how the user assigns them. When a pin is assigned for one function, its other functions are not available. Thus, for a UTOPIA-capable CPM, when its pins are used in UTOPIA mode, the designer waives other functionality otherwise available on those pins. Given the number of pins consumed by the UTOPIA interface, this functionality loss can be significant. In a design in which the CPM does not include a UTOPIA interface, or one in which its UTOPIA interface is not used in order to preserve other functionality, a different means is necessary to connect it to the UTOPIA PHY.

Many CPMs include one or more serial communications controllers (SCC). A SCC might be programmed for time slot assigner (TSA) mode, in which case it is used as a TDM (Time Division Multiplexed) bus. Typically, a TDM bus requires only six pins, three for transmit and three for receive. Thus, a TDM bus interface requires significantly fewer pins than a UTOPIA interface.

SUMMARY OF THE INVENTION

A method and apparatus are described for interfacing between a physical layer (PHY) interface and a bus.

For the receiver side, the method comprises (a) receiving a downstream (DS) clock signal from a physical layer transceiver, (b) receiving a first plurality of PHY interface receiver signals from the PHY interface, and (c) generating bus receiver signals to the bus and a second plurality of PHY interface receiver signals to the PHY interface using the DS clock signal and the first plurality of PHY interface receiver signals.

For the transmitter side, the method comprises (a) receiving an upstream (US) clock signal from a physical layer transceiver, (b) receiving a first plurality of bus transmitter signals from the bus and a first plurality of PHY transmitter signals from the PHY interface, and (c) generating a second plurality of bus transmitter signals to the bus and a second plurality of PHY transmitter signals to the physical interface using the US clock signal, the one or more PHY transmitter signals and the one or more bus transmitter signals.

Other features and advantages of the invention will be apparent from the detailed description and drawings provided herein.

BRIEF DESCRIPTION OF THE DRAWINGS

The present invention is illustrated by way of example and not limitation in the figures of the accompanying drawings in which like references indicated similar elements which.

DETAILED DESCRIPTION

Figure 1:
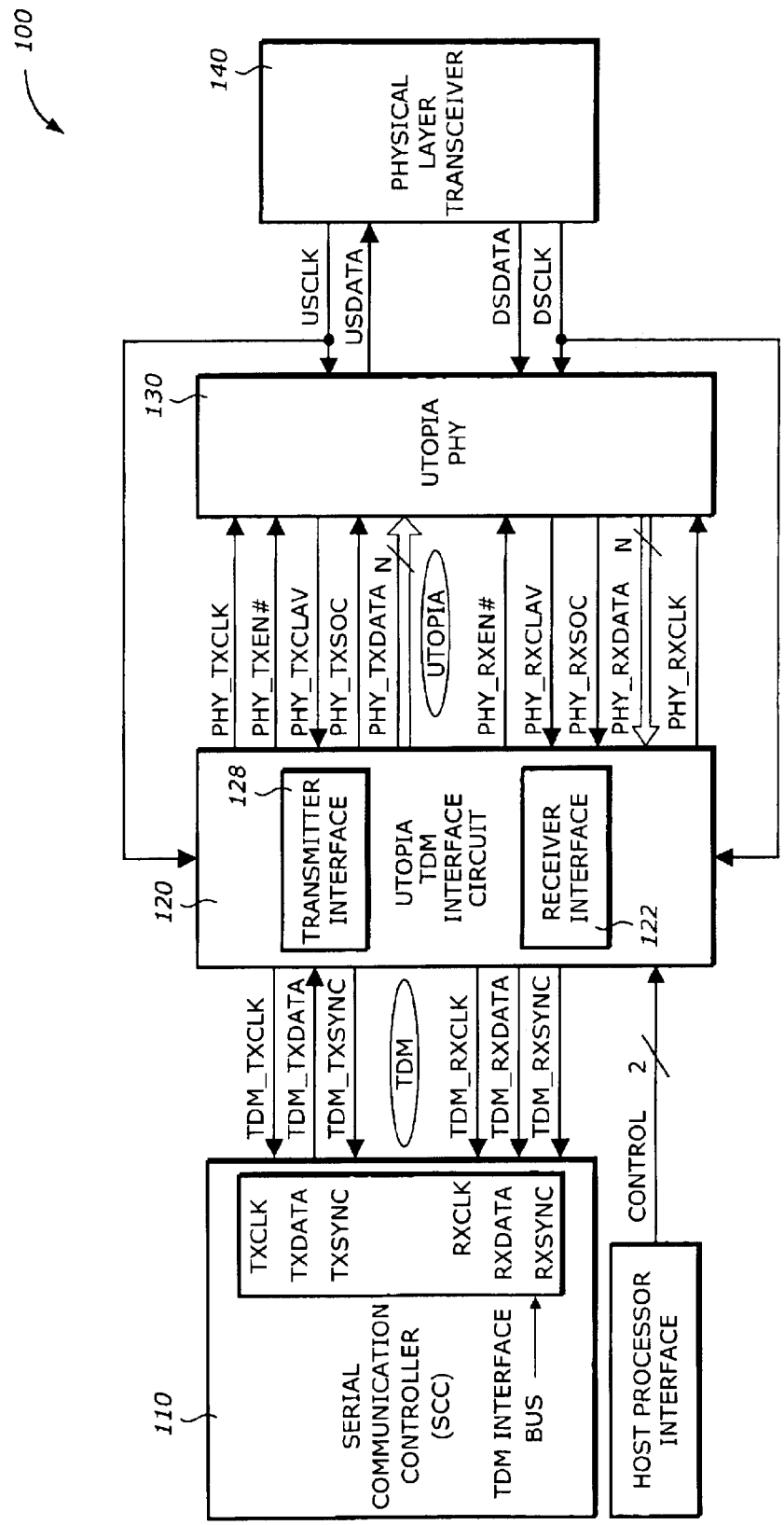
FIG. 1 shows a system in which one embodiment of the invention can be practiced.

A method and apparatus are described for interfacing a bus to a physical layer (PHY) interface. The conversion scheme in the interfacing circuit uses clocking derived from the physical layer transceiver transmit and receive bit clocks to provide appropriate transmit and receive clocks to both the bus and the PHY interface.

In the following description, the notation # after a signal name indicates that the signal has an active LOW level, i.e., the signal is asserted when it has a logic LOW level. The description refers to the ATM model and the TDM bus as an interface example. It is contemplated that the technique is applicable to other models, buses, or network architectures with similar characteristics.

ATM technology provides a high level of services to data communication. The basic idea of ATM is to transmit information in small, fixed-size packets called cells. The cells are 53 bytes long, of which 5 bytes are header and 48 bytes are payload. The advantages of using cell-switching technology in ATM includes flexibility in accommodating both constant and variable rate traffic, high speeds of data transfers, and broadcasting ability.

An ATM network architecture includes a physical layer, an ATM layer, and an ATM adaptation layer. The physical layer deals with the physical medium. The ATM layer deals with cells and cell transport, including congestion control. The ATM adaptation layer provides segmentation and reassembly of packets of cells. The UTOPIA is an interface between an upper ATM layer module and a physical layer (PHY) module. When the UTOPIA is interfaced to a system such as an embedded system having a communication controller with a bus, an interface circuit between the UTOPIA and such a bus is necessary.

A communication processor module (CPM) in an embedded system typically includes one or more serial communication controllers (SCC). A SCC might be programmed for time slot assigner (TSA) mode. In this mode, the SCC is used as a time division multiplexed (TDM) bus. Communication between a UTOPIA PHY and a TDM bus using the SCC in the TSA mode requires a conversion scheme between them. The UTOPIA-to-TDM (for received data) and TDM-to-UTOPIA (for transmit data) converter accomplishes this. The converter provides clocking for both the UTOPIA PHY and the TDM bus for both transmit and receive directions. It provides appropriate synchronization (SYNC) and handshaking signals as well as serial-parallel data conversion. Using the time-slot assignor, 53 byte frames (alternately 64 byte frames if required) are defined for both transmit and receive data. The TDM bus requires appropriate clock and sync signals and serial data streams in both transmit and receive directions. The converter provides transmitter clock and receiver clock (and their respective sync and data) signals to the TDM bus. It derives these clocks from the individual transmit and receive clocks from the physical layer communications transceiver. For rate adaptive interfaces with independent transmit and receive clock rates such as some xDSL technologies, the clock tracks with the selected data rates. The converter also provides the appropriate parallel-to-serial and serial-to-parallel data conversion. Alternatively, the clocks can be derived from an external, non-related source.

The converter or the UTOPIA-TDM interface circuit (UTIC), or the PHY-to-bus interface circuit (PBIC) supplies the clocking for both the TDM and UTOPIA PHY interfaces. The data transfer and handshake clocking for each direction is independent and is derived from corresponding independent physical layer transceiver data clocks. Thus, for rate adaptive and physical layer transceivers such as xDSL transceivers, transmit and receive clocking tracks with the bit rate of the line's upstream and downstream bit rates. The upstream and downstream bit rates may be independent. The UTIC data transfer rates can be increased by optional clock multipliers.

The optional clock multipliers for each direction can be used to speed up the cell handoff between the UTOPIA PHY and the TDM bus. For the downstream direction, this bandwidth increase accommodates internally generated management cells originating in the UTOPIA PHY which need to be received by the ATM layer in addition to the cells coming in from the external line. For the upstream direction, management cells originating in the ATM layer and destined for the UTOPIA PHY can be accommodated as well as the cells intended for the physical layer transceiver.

An embodiment of the invention uses the rate matching buffers of the UTOPIA PHY for flow control on the PHY side for both transmit and receive directions. Based on the UTOPIA PHY flow control handshaking signals for each direction, the TDM bus transfer for the corresponding direction can independently be stopped. This is done by either withholding the TDM receiver sync or TDM transmitter sync signals to the TDM interface or by gating on or off the respective TDM clocks. At the TDM interface, the converter gates the TDM frame sync signals or optionally the TDM clocks for initiating data transfer.

The SCC requires that the TDM receive data be byte aligned with the TDM receiver sync signal. The converter's TDM receiver sync signal provides not only byte alignment but also cell alignment, derived from the inherent alignment of the UTOPIA PHY receiver start of cell (SOC) with Header 1 (H1) on PHY receiver data.

The UTOPIA PHY transmit interface requires that UTOPIA signal PHY transmitter SOC be aligned with the first byte, Header 1 (H1) on PHY transmitter data of the ATM cell. The UTIC provides this alignment based on inherent TDM transmitter sync alignment with the first byte of the defined 53 (or 64) byte TDM frame. The time slot assignor (TDM bus) outputs the ATM cell byte by byte, H1 first, followed by subsequent bytes in order.

Pin limitations on a communications processor may preclude the designer from interfacing it directly to a UTOPIA interface. Alternatively, a communications controller may include a TDM bus but not include a UTOPIA interface. The primary advantage of the present invention is the reduction in pin count required by a TDM bus interface relative to that required for a UTOPIA interface. The number of pins required by a TDM bus interface is typically six while a UTOPIA interface requires a minimum of 16 pins for an eight-bit wide UTOPIA data bus or 24 pins for a 16-bit wide UTOPIA data bus. Clocking for both the UTOPIA and TDM interfaces can be extracted conveniently from the serial upstream and downstream physical line rate. Alternatively, an external clock can be used.

FIG. 1 is a diagram illustrating a system 100 in which one embodiment of the invention can be practiced. The system 100 includes a serial communication controller (SCC) 110, a UTOPIA-TDM interface circuit (UTIC) 120, a UTOPIA physical layer (UTOPIA PHY) 130, and a physical layer transceiver 140.

The SCC 110 provides the TDM interface to the UTIC 120. The TDM interface includes the receiver and transmitter signals. These signals include TDM receiver clock (TDM_RXCLK), receiver data (TDM_RXDATA), receiver sync (TDM_RXSYNC), transmitter clock (TDM_TXCLK), transmitter data (TDM_TXDATA) and transmitter sync (TDM_TXSYNC) signals. The SCC 110 may be any device that can perform time division multiplexing serial communication. For one embodiment, the SCC 110 is the MPC860SAR Communication Controller manufactured by Motorola.

The UTOPIA-TDM interface circuit (UTIC)120 provides the conversion of signals between the TDM bus of the SCC 110 and the UTOPIA PHY 130. The UTIC 120 includes a receiver interface circuit 122 and a transmitter interface circuit 128. The receiver interface circuit 122 and the transmitter interface circuit 128 operate independently. The source of the clocking originates from the physical layer transceiver 140, both for the downstream (receive) and upstream (transmit) data flow. The transmit and receive data buses are independent of each other. The UTIC 120 uses cell level handshaking for both downstream and upstream data flow.

The receiver interface circuit 122 receives the downstream clock (DSCLK) from the physical layer transceiver 140 as the basic clocking signal for timing and clock generation, synchronization and handshaking operation. The receiver interface circuit 122 generates the PHY_RXCLK signal derived from the DSCLK to the UTOPIA PHY. The receiver interface circuit 122 also receives a PHY receiver cell available (PHY_RXCLAV) signal, a PHY receiver start of cell (PHY_RXSOC), and PHY receiver data (PHY_RXDATA) from the UTOPIA PHY 130. The PHY_RXDATA bus has a size of N bits where N may be 8 or 16. The receiver interface circuit 122 generates a PHY receiver enable low (PHY_RXEN#) signal to the UTOPIA PHY 130. The receiver interface circuit 122 also generates a TDM receiver clock (TDM_RXCLK) signal, a TDM receiver data (TDM_RXDATA) signal, and a TDM receiver sync (TDM_RXSYNC) signal to the TDM interface of the SCC 110.

The transmitter interface circuit 128 receives the upstream clock (USCLK) from the physical layer transceiver 140 as the basic clocking signal for timing and clock generation, synchronization and handshaking operation. The transmitter interface circuit 128 also receives a PHY transmitter cell available (PHY_TXCLAV) signal from the UTOPIA PHY 130, and TDM transmitter data (TDM_TXDATA) signals from the TDM interface of the SCC 110. The transmitter interface circuit 128 generates a PHY transmitter enable low (PHY_TXEN#) signal, a PHY transmitter start of cell (PHY_TXSOC), and PHY transmitter data (PHY_TXDATA) signal to the UTOPIA PHY 130. The PHY_TXDATA bus has a size of N bits where N may be 8 or 16. The transmitter interface circuit 128 also generates a TDM transmitter clock (TDM_TXCLK) signal and a TDM transmitter sync (TDM_TXSYNC) signal to the TDM interface of the SCC 110.

The UTOPIA PHY 130 includes circuits to receive and transmit data to and from the physical layer transceiver 140 and the UTIC 120. The UTOPIA PHY 130 interfaces to the physical layer transceiver 140 to receive the USCLK and the DSCLK signals and the downstream data (DSDATA). The UTOPIA PHY 130 generates the upstream data (USDATA) to the physical layer transceiver 140.

On the receiver side, the UTOPIA PHY 130 generates the PHY_RXCLAV, PHY_RXSOC, and PHY_RXDATA signals to the UTIC 120, and receives the PHY_RXEN# and the PHY_RXCLK signals from the UTIC 120. On the transmitter side, the UTOPIA PHY 130 receives the PHY_TXEN#, the PHY_TXSOC, the PHY_TXCLK, and the PHY_TXDATA signals from the UTIC 120, and generates the PHY_TXCLAV signal to the UTIC 120.

The physical layer transceiver 140 provides the DSCLK and USCLK signals to the UTOPIA PHY 130 and the UTIC 120. The DSCLK and the USCLK signals may be generated independently. The DSCLK is the serial bit rate clock. In the case of a xDSL interface, this clock would correspond to the clock derived from the incoming line rate. Alternatively, for local loopback testing, a local system generated clock can be used. This might be desirable in the event there is no line clock available. For technologies with identical upstream and downstream clocking rates, one clock may be used for both directions.

The physical layer transceiver 140 also receives the upstream data (USDATA) from the UTOPIA PHY 130 and generates the downstream data (DSDATA) to the UTOPIA PHY 130.

Receiver (Downstream) Operation

Figure 2:
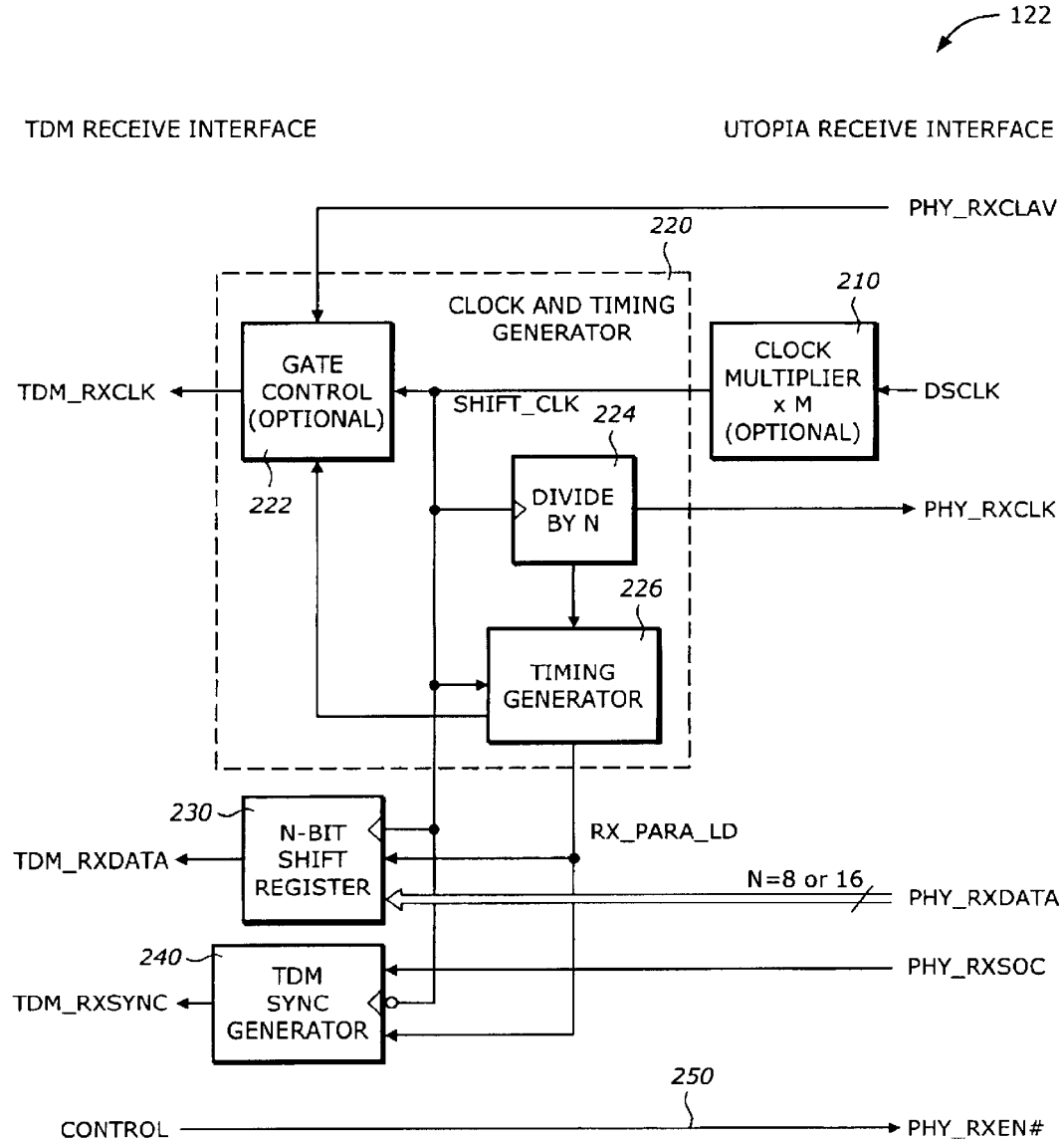
FIG. 2 shows a receiver interface circuit according to one embodiment of the invention.

FIG. 2 is a diagram illustrating a receiver interface circuit 122 according to one embodiment of the invention. The receiver interface circuit 122 includes an optional clock multiplier 210, a clock and timing generator 220, a shift register 230, a TDM sync generator 240, and an enable control 250.

The clock multiplier 210 receives the downstream clock (DSCLK) from the physical layer transceiver 140 (FIG. 1). The clock multiplier 210 is used to speed up the cell handoff from the UTOPIA PHY 130 to the TDM interface of the SCC 110. The advantage of this is that there may be internally generated management cells originating in the UTOPIA PHY 130 which need to be received in addition to the cells coming in from the external line. Otherwise the handoff would only be able to keep up with the cells received from the physical layer transceiver. The output of the clock multiplier 210 is a SHIFT_CLK signal.

The clock and timing generator 220 includes a gate control circuit 222, a divide-by-N circuit 224, and a timing generator 226. The clock and timing generator 220 generates the TDM_RXCLK signal to the TDM interface of the SCC 110, the PHY_RXCLK signal to the UTOPIA PHY 130, and timing signals, SHIFT_CLK and RX_PARA_LD, to the shift register 230 and the TDM sync generator 240.

The gate control circuit 222 functions as a gating mechanism for the TDM_RXCLK signal. It stops the TDM_RXCLK signal when there are no further bits/cells to transfer. The gate control circuit 222 receives the PHY_RXCLAV signal from the UTOPIA PHY 130 (FIG. 1). The PHY_RXCLAV signal goes inactive when there are no receive cells available for transfer or as a result of the PHY_RXEN# going inactive. Thus system control of PHY_RXEN# signal indirectly controls the gating of the TDM_RXCLK signal. In this effect, the TDM_RXCLK signal can be made inactive when there are no ATM cells to transfer. One implementation of the gate control circuit 222 consists of the PHY_RXCLAV signal as the data input to a flip-flop enabled with a RX_PARA_LD pulse from the timing generator 226.

The preferred method of indicating there is no cell available for transfer is by allowing TDM_RXCLK to run free and instead disabling the TDM_RXSYNC pulse in the TDM sync generator 240. When the TDM_RXCLK gate control option is not included, the TDM_RXCLK signal is the same as the SHIFT_CLK signal, and the PHY_RXCLAV signal is not needed.

The divide-by-N circuit 224 provides the UTOPIA PHY_RXCLK signal and a triggering signal for the timing generator 226. The UTOPIA PHY_RXCLK signal is a 50% duty cycle clock derived from the SHIFT_CLK signal with a divide by N where N is 8 or 16 corresponding with the width of the UTOPIA receive data bus. In the following description, N will be 8 for illustration purposes. If the SHIFT_CLK signal does not have a 50% duty cycle, the PHY_RXCLK signal still has a 50% duty cycle as required by the UTOPIA Level 2 specification.

The timing generator 226 receives the triggering signal from the divide-by-N circuit 224 to generate a RX_PARA_LD signal. For one embodiment, the RX_PARA_LD signal is generated directly from the divide-by-N circuit 224. The RX_PARA_LD signal is used for sampling of various PHY generated signals as well as internal signals. The RX_PARA_LD signal duration is one SHIFT_CLK wide occurring once per PHY_RXCLK cycle. This timing pulse is positioned to occur such that sampling of PHY generated signals occurs during the stable periods regardless of whether the PHY uses low-to-high or high-to-low transitions of PHY_RXCLK signal to generate those signals. As shown in the timing diagram of FIG. 3, sampling of PHY signals occurs at the rising edge of clocks 2, 10, 18, 26, 34 using the RX_PARA_LD signal. Alternate implementations could sample at different TDM_RXCLK pulses (i.e., +1, −2) relative to this implementation. The RX_PARA_LD signal is used by the N-bit shift register 230 for the synchronous, parallel load timing signal. It is also used by the TDM sync generator 240.

The shift register 230 is an N-bit shift register. The shift register 230 uses the RX_PARA_LD signal to load the sampled PHY_RXDATA into the shift register. Subsequent rising edges of SHIFT_CLK cause the bit cells to be serially shifted out the TDM_RXDATA signal line. The loading and shift sequence is continuous even when no valid cells are actually being transferred. The TDM interface of the SCC 110 recognizes the valid TDM_RXDATA for the duration of its programmed frame size beginning from the point it recognizes a TDM_RXSYNC pulse.

The TDM sync generator 240 receives the SHIFT_CLK and RX_PARA_LD signals to generate a TDM_RXSYNC signal. The serial mode time slot assignor of the TDM bus interface in the SCC 110 is programmed for a 53 (or 64) byte frame corresponding with the ATM cell size. For ATM cell processing, the ATM controller in serial mode accepts byte-aligned data from the serial interface. In serial mode the ATM controller provides the transmission convergence (TC) layer which adds cell delineation. The TDM_RXSYNC signal supplied by the UTIC 120 provides not only byte alignment but also cell alignment. The TDM_RXCLK clock can run free, and when a cell is available, the UTIC 120 provides the sync signal at the beginning of the frame. If no cells are ready, the TDM_RXCLK continues to run but no frame sync signal is generated. Specifically, The TDM sync generator 240 generates the TDM_RXSYNC based on the sampled PHY_RXSOC signal and the RX_PARA_LD pulse.

The SCC 110 is programmed to sample the TDM_RXSYNC signal on the rising edge of TDM_RXCLK signal. The TSA is programmed such that there is minimal TDM_RXCLK clock delay from TDM_RXSYNC to the first bit of the frame. The UTIC provides for TDM_RXDATA on the rising edge of TDM_RXCLK signal, and the SCC samples the TDM_RXDATA on the falling edge of the TDM_RXCLK signal.

The enable controller 250 is from an external source such as the SCC 110 or an external host processor.

Figure 3A:
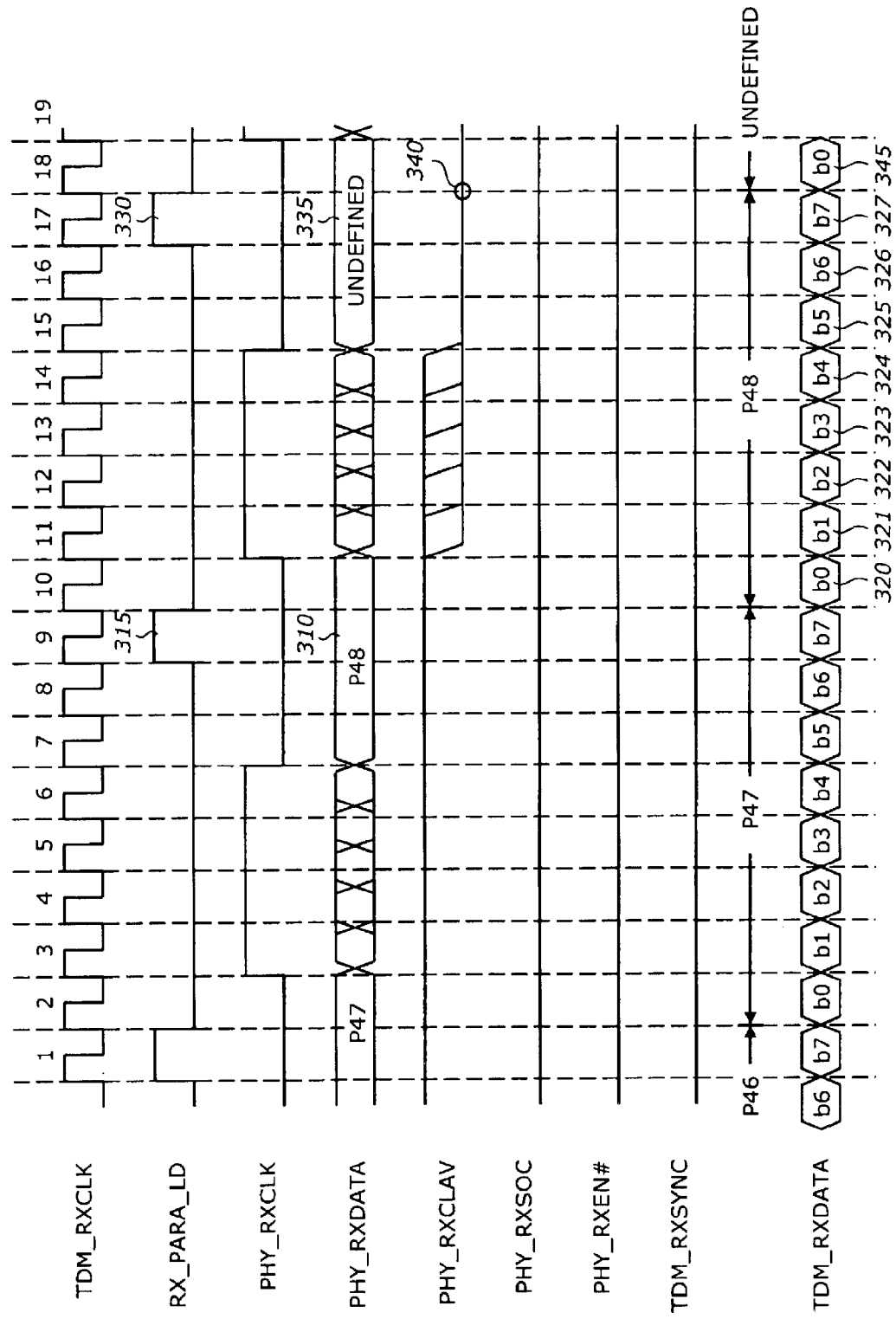
FIG. 3A shows a first portion of a timing diagram for the receiver.
Figure 3B:
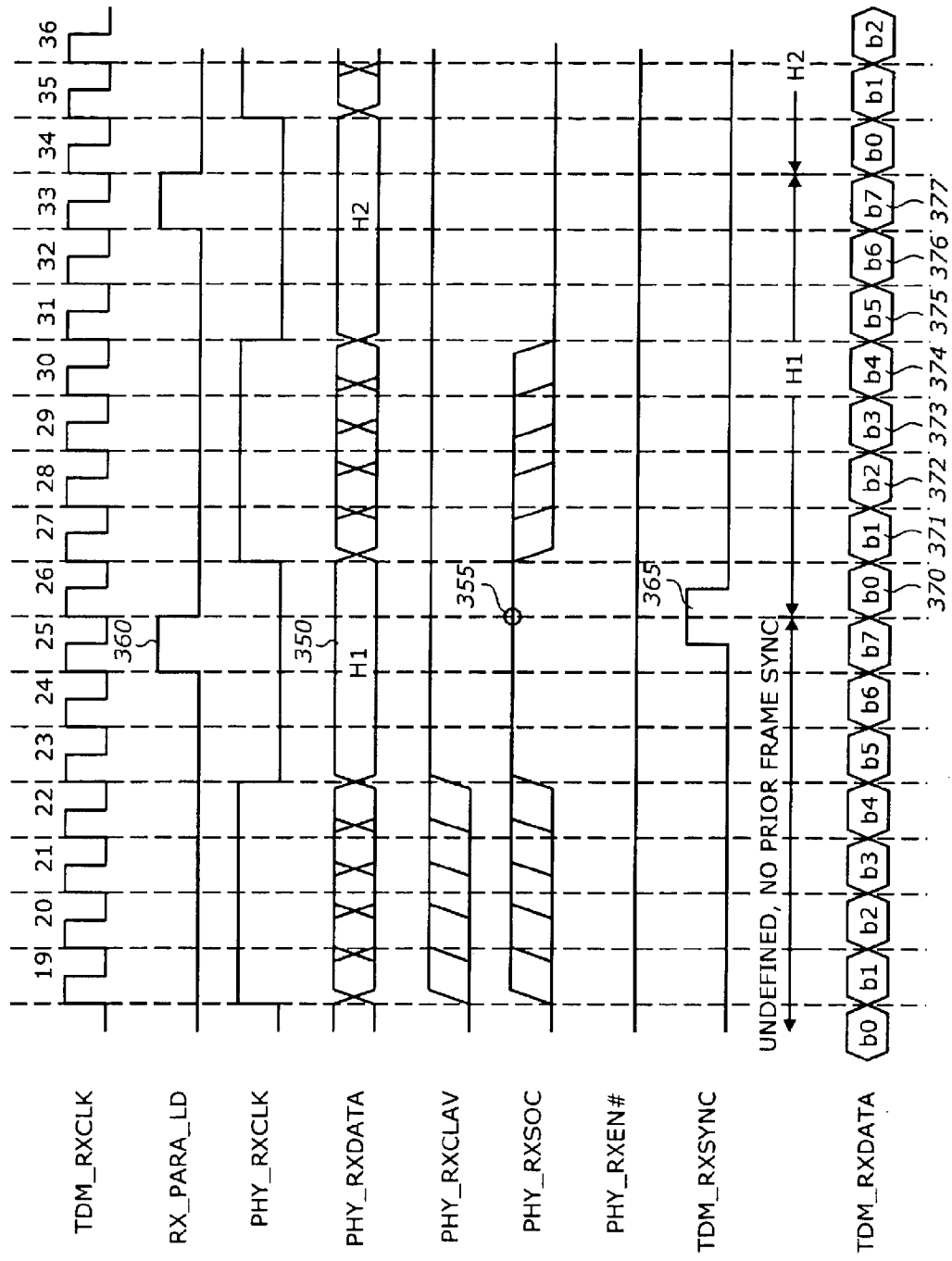
FIG. 3B shows a second portion of a timing diagram for the receiver.

FIGS. 3A and 3B illustrate a timing diagram for the receiver according to one embodiment of the invention. The clock used in the following discussion is the TDM_RXCLK signal. FIG. 3A is a diagram illustrating a first portion of a timing diagram from clock numbers 1 through 18 of the TDM_RXCLK signal for the receiver according to one embodiment of the invention. FIG. 3A illustrates the end-of-cell timing sequence.

The end-of-cell timing sequence occurs from TDM_RXCLK pulses #1–#17. UTOPIA octet P48 310 is sampled at the rising edge of TDM_RXCLK #10 using the RX_PARA_LD pulse 315, and is shifted out serially on TDM_RXCLK #10–#17 to TDM_RXDATA. The serial data appearing on the TDM_RXDATA include the bit sequence 320, 321, 322, 323, 324, 325, 326, 327 corresponding to bits b0, b1, b2, b3, b4, b5, b6, and b7. The SCC 110 samples TDM_RXDATA bits on the falling edges of TDM_RXCLK. The PHY_RXSOC is not active from TDM_RXCLK #1 through 18 including TDM_RXCLK #17 during the RX_PARA_LD 330 and therefore, no TDM_RXSYNC pulse is generated.

The undefined data on the PHY_RXDATA 335 when the PHY_RXCLAV 340 is inactive, is subsequently shifted out on TDM_RXDATA 345. However, for UTOPIA cell handshaking, this only occurs after the 53 (or 64) byte cell has been completed. Thus the corresponding TDM_RXDATA 345 occurs beyond the end of the 53 (or 64) byte frame defined in the TSA and is therefore ignored. Not until an ensuing TDM_RXSYNC pulse does the TSA process data present on the TDM_RXDATA signal.

FIG. 3B is a diagram illustrating a second portion of a timing diagram from clock numbers 19 through 36 of the TDM_RXCLK signal for the receiver according to one embodiment of the invention. FIG. 3B illustrates the start-of-cell timing sequence.

When a new cell becomes available, the UTOPIA PHY 130 (FIG. 1) presents the first byte, H1, on the PHY_RXDATA 350 and asserts the PHY_RXSOC 355. At the TDM_RXCLK #25 falling edge, during the RX_PARA_LD 360, because the PHY_RXSOC 355 is active, the TDM_RXSYNC pulse 365 is generated. The H1 data 350 is clocked out serially on the TDM_RXDATA signal in the bit sequence 370, 371, 372, 373, 374, 375, 376, and 377, corresponding to bits b0, b1, b2, b3, b4, b5, b6, and b7, respectively. The UTOPIA PHY 130 deasserts the PHY_RXSOC signal for subsequent octets until H1 of the next cell is available.

Transmit (Upstream) Operation

The transmitter interface circuit 128 is independent of the receiver interface circuit 122 in the UTIC 120. The internal clock for the transmitter interface circuit 128 is derived from the upstream clock (USCLK) available from the physical layer transceiver 140. Because it generates both the TDM_TXSYNC and UTOPIA PHY_TXSOC signals, the transmitter interface circuit 128 is more complex than the receive circuit. Cell level handshaking is used between the UTIC 120 and the UTOPIA PHY 130.

Framing between the UTIC 120 and the time slot assignor is done by defining a 53-byte (or 64 byte) frame in the time slot assignor. The UTIC 120 provides a constant clock and a sync signal. The clock runs free and when the time slot assignor receives a TXSYNC signal, it clocks out serial data to the UTIC 120. This scheme takes advantage of the fact that the time slot assignor aligns the transmitted frame with the transmit sync pulse, effectively providing cell alignment. The UTIC 120 subsequently uses this alignment to generate the PHY_TXSOC signal for the UTOPIA PHY 130. When the UTOPIA PHY 130 cannot accept further cells, it deasserts its PHY_TXCLAV handshake signal. The UTIC 120 detects this condition and lets the TDM_TXCLK signal run but does not provide an ensuing TDM_TXSYNC signal. Alternatively, the TDM_TXCLK signal can be gated off when this condition exists.

Figure 4:
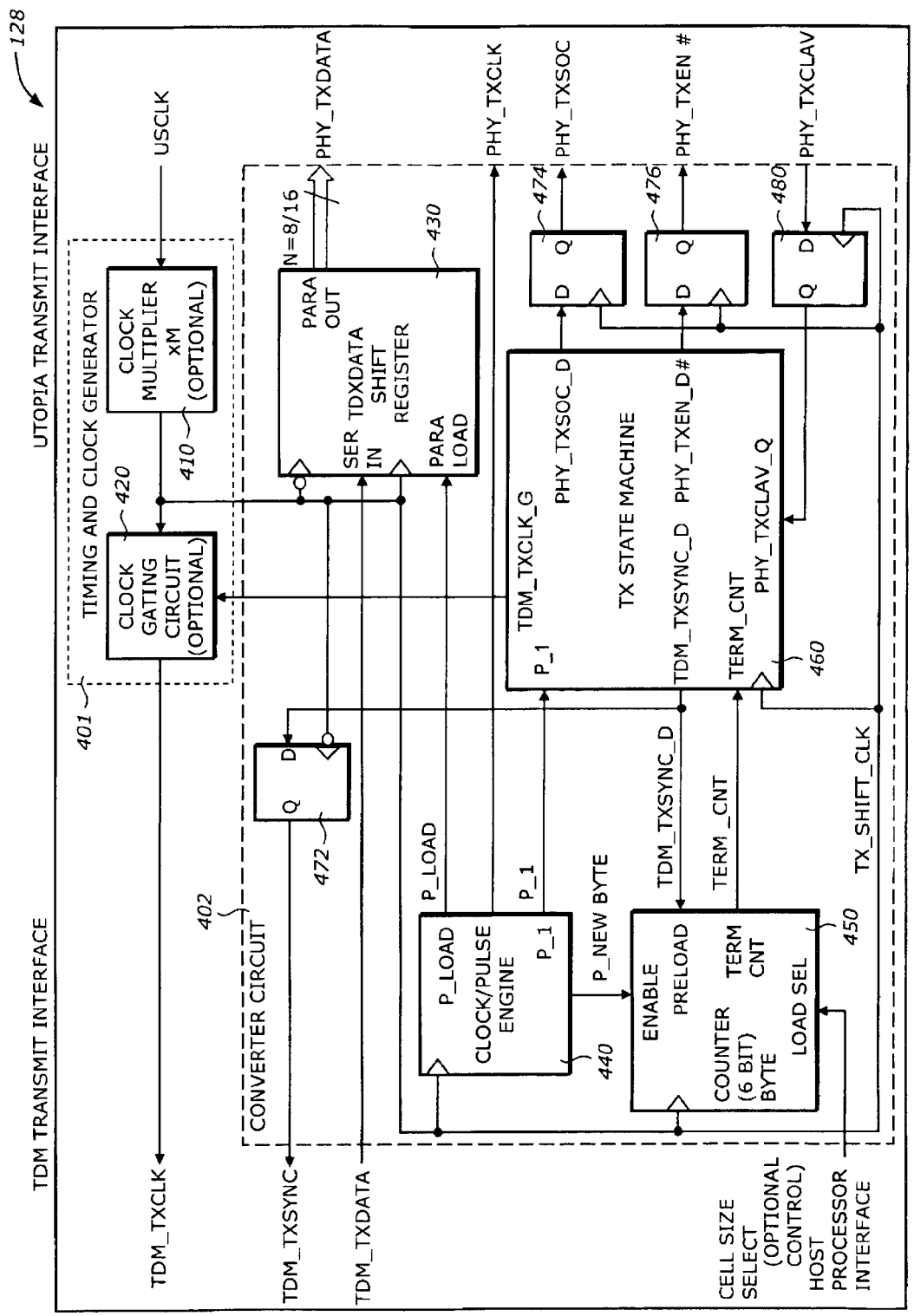
FIG. 4 shows a transmitter interface.

FIG. 4 is a diagram illustrating a transmitter interface circuit 128 shown in FIG. 1 according to one embodiment of the invention. The transmitter interface circuit 128 includes a timing and clock generator circuit 401 and a converter circuit 402. The timing and clock generator circuit 401 includes an optional clock multiplier 410 and a clock gating circuit 420. The converter circuit 402 includes a transmitter data shift register 430, a clock/pulse engine 440, a byte counter 450, a transmitter state machine 460, and signal synchronizers 472, 474, 476 and 480.

The clock multiplier 410 receives the USCLK signal from the physical layer transceiver 140 and generates a TX_SHIFT_CLK signal. The USCLK signal is the serial bit rate clock available from the physical layer transceiver 140. For example, in the case of a xDSL interface, this clock would correspond to the clock derived from the outgoing line rate. Alternatively, for local loopback testing, a local system generated clock can be used. This might be desirable in the event there is no line clock available.

The clock multiplier 410 is optional and can be used to speed up the cell handoff to the UTOPIA PHY 130 from the TDM interface of the SCC 110. The advantage of this is that the flow of cells originating at the host ATM layer destined for the line will not be delayed in the event management cells destined for termination at the UTOPIA PHY 130 are added in the queue. The TX_SHIFT_CLK signal is the master clock used by the transmitter interface circuit 128.

The clock gating circuit 420 provides an optional means of gating the TX_SHIFT_CLK signal to the TDM_TXCLK signal during periods in which no valid TDM transmit data is transferred. When this option is not used, the TX_SHIFT_CLK and TDM_TXCLK are the same signal.

The clock/pulse engine 440 continuously generates four timing signals: a PHY_TXCLK signal, a P_LOAD signal, a P_1 signal, and a P_NEWBYTE signal. These timing signals have defined timing relationships to each other and are used to synchronize the transmit circuitry. The PHY_TXCLK is a 50% duty cycle divide by N output of the TX_SHIFT_CLK signal, and drives the UTOPIA PHY_TXCLK. N is either 8 or 16, depending on the width of the UTOPIA transmit data bus. Each of the P_LOAD, P_1, and P_NEWBYTE signals consists of one pulse per PHY_TXCLK cycle, one TX_SHIFT_CLK wide, used by various elements of the transmit circuitry. Their timing relative to the PHY_TXCLK signal is shown in timing diagrams in FIGS. 6A, 6B, 7A, 7B, 8A and 8B.

The P_LOAD timing pulse, described below, is used by the transmitter data shift register 430 as a signal to load the serially shifted in TDM bus data from the SCC 110 to become the parallel PHY_TXDATA signal. The P_1 pulse is used by the transmitter state machine 460 as a qualification signal. The P_NEWBYTE signal is used by the byte counter 450 as a count enable signal.

The byte counter 450 is a 6-bit synchronous counter with pre-load, count enable, and terminal count functionality. It continuously counts and receives a pre-load signal (TDM_TXSYNC_D) from the transmitter state machine 460. The byte counter 450 generates a terminal count TERM_CNT signal to the transmitter state machine 460. The transmitter state machine 460 uses the counter's terminal count output as a signal that the end of a cell transfer is approaching. The pre-load value corresponds to a value appropriate for 53 byte cells or for 64 byte cells. The choice for either of the two values can be optionally selectable with an external CELL SIZE SELECT control signal, which comes from the host processor interface.

The transmitter data shift register 430 includes an N-bit, serial-in parallel-out shift register and an N-bit parallel buffer. The data presented by the TDM interface of the SCC 110 on the rising edge of the TDM_TXCLK signal is continuously clocked into the shift register on the falling edge of the TX_SHIFT_CLK signal. The N-bit data from the shift register is synchronously loaded into the parallel buffer on the rising edge of the TX_SHIFT_CLK signal when the P_LOAD signal is high which occurs every N TX_SHIFT_CLK cycles. Due to the synchronization between the TDM_TXSYNC signal and P_LOAD signals, this parallel data is byte aligned (N=8), or word aligned (N=16).

The signal synchronizers 472, 474, 476, and 480 synchronize and register the TDM_TXSYNC, the PHY_TXSOC, the PHY_TXEN#, and the PHY_TXCLAV signals, respectively, to preclude the occurrence of false outputs which may be inherent in the state machine outputs. The signal synchronizers 472, 474, 476, and 480 can be implemented by D flip-flops clocked by the TX_SHIFT_CLK signal.

Figure 5A:
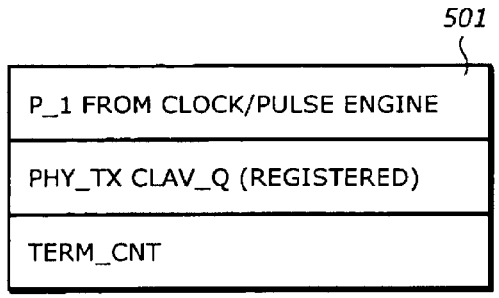
FIG. 5A shows inputs and outputs of a transmitter state machine.

The transmitter state machine 460 is responsible for cycling through the various cell transfer states, sensing and controlling handshaking signals of the UTOPIA PHY 130 and the TDM interface of the SCC 110. The inputs and outputs of the transmitter state machine 460 are shown in FIG. 5A. When reset, it goes to an idle state, S0. When not reset, from the idle state S0, when it senses assertion of the PHY_TXCLAV signal, it initiates a TDM frame transfer via the TDM_TXDATA signal by providing a TDM_TXSYNC pulse. The transmitter state machine 460 provides appropriate handshaking signals PHY_TXSOC and PHY_TXEN# destined for the UTOPIA PHY 130 during the cell transfer. During the presentation of the second to last PHY_TXDATA byte, the PHY_TXCLAV signal is again sampled. If the PHY_TXCLAV signal remains asserted at that time, an additional cell transfer is initiated without interruption. If the PHY_TXCLAV signal is deasserted, the transmitter state machine 460 transfers the remaining bytes of the cell, and returns to the idle state S0, deasserting the PHY_TXEN# signal.

FIG. 5A is a diagram illustrating inputs and outputs of a transmitter state machine 460 shown in FIG. 4 according to one embodiment of the invention. The inputs and outputs include an input table 501 and an output table 502.

The input table 501 includes the P1_signal, the PHY_TXCLAV_Q signal, and the TERM_CNT signal. The P1_signal is generated from the clock/pulse engine 440. The PHY_TXCLAV_Q signal is provided by the signal synchronizer 480. The signal synchronizer 480 synchronizes the PHY_TXCLAV by the TX_SHIFT_CLK signal. The TERM_CNT signal is generated by the byte counter 450.

The output table 502 includes a PHY_TXSOC_D signal, a PHY_TXEN_D# signal, a TDM_TXSYNC_D signal, and an optional TDM_TXCLK_G signal. The PHY_TXSOC_D signal is synchronized by the signal synchronizer 474 to generate the PHY_TXSOC signal to the UTOPIA PHY 130. The PHY_TXEN_D# signal is synchronized by the signal synchronizer 476 to generate the PHY_TXEN# signal to the UTOPIA PHY 130. The TDM_TXSYNC_D signal is synchronized by the signal synchronizer 472 to generate the TDM_TXSYNC signal to the TDM interface of the SCC 110. The TDM_TXSYNC_D signal is also used by the byte counter 450. The TDM_TXCLK_G signal is the optional gate control signal to gate the TDM_TXCLK signal to the TDM interface of the SCC 110.

The output table 502 also provides the values of the outputs at various states of the transmitter state machine 460. The PHY_TXSOC_D signal is asserted HIGH in state S3 and deasserted LOW in other states. The PHY_TXEN_D# signal is deasserted HIGH in states S0, S1, and S2, and asserted LOW in other states. The TDM_TXSYNC_D signal is asserted HIGH in states S1 and S5 and deasserted LOW in other states. The TDM_TXCLK_G is asserted HIGH in states S1, S2, S3, S4, S5, and S6, and deasserted LOW in other states.

Figure 5B:
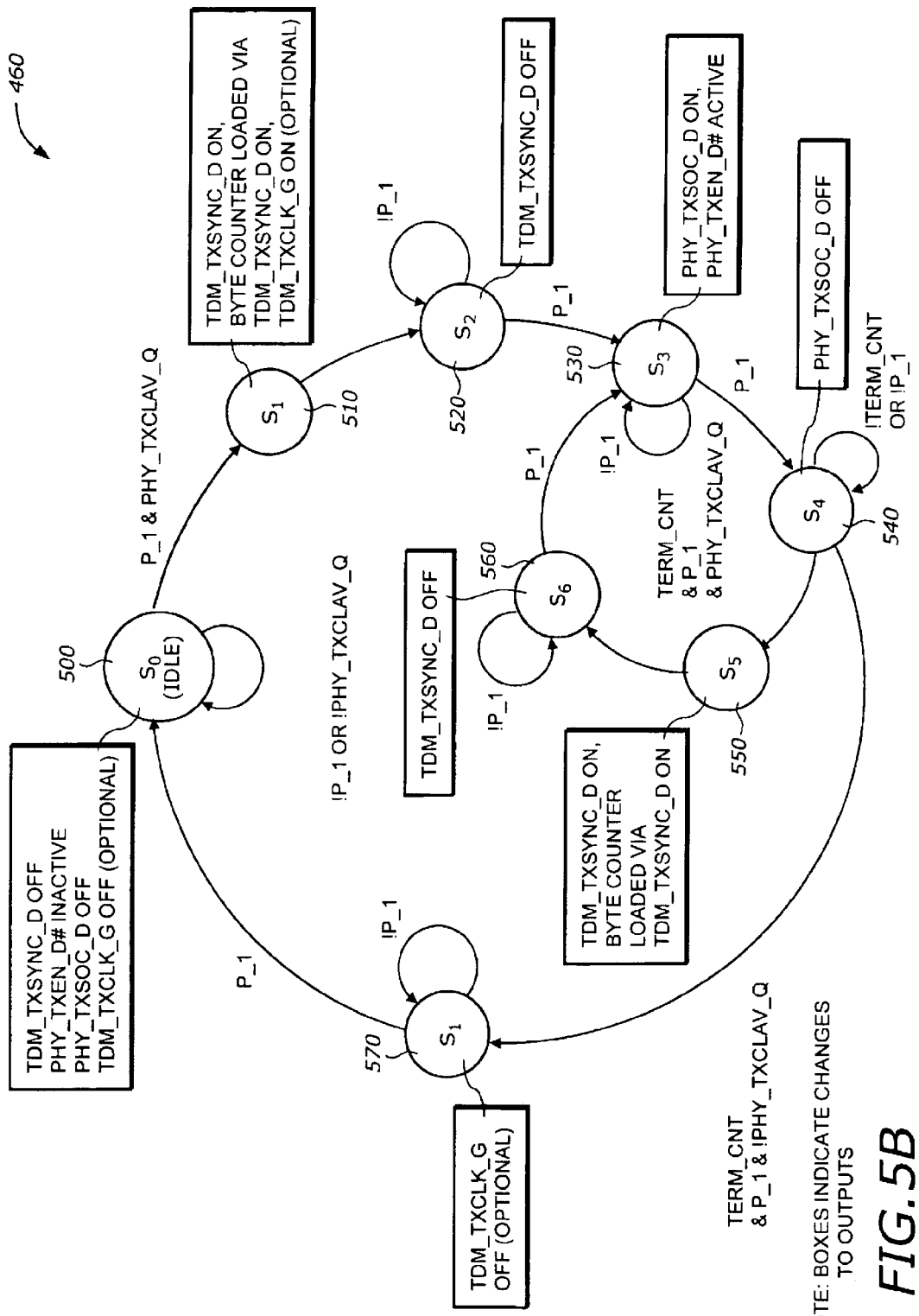
FIG. 5B shows a state diagram of a transmitter state machine.

FIG. 5B is a diagram illustrating a state diagram of a transmitter state machine 460 shown in FIG. 4 according to one embodiment of the invention. The transmitter state machine 460 includes eight states: S0 500, S1 510, S2 520, S3 530, S4 540, S5 550, S6 560, and S7 570. The clock used in the following discussion is the TX_SHIFT_CLK signal.

The states in the transmitter state machine 460 form into at least three modes of operation: a transmit start-of-cell sequence, a transmit end-of-cell sequence, and a transmit back-to-back continuous cell transfer sequence. The transmit start-of-cell sequence is formed by the state sequence S0, S1, S2, S3, and S4. The transmit end-of-cell sequence is formed by the state sequence S4, S7, and S0. The transmit back-to-back continuous cell transfer sequence is formed by the state sequence S4, S5, S6, and S3.

The state S0 500 is an idle state. The state S0 500 is transitioned from the state S7 570 upon a P_1 pulse. In addition, although not shown, an assertion of reset will force a transition from any other state to the state S0 500. In the state S0 500, the TDM_TXSYNC_D, PHY_TXSOC_D, and TDM_TXCLK_G are off, or deasserted LOW. In addition, the PHY_TXEN_D# signal is inactive, or deasserted HIGH. Upon assertion of the P_1 pulse while the PHY_TXCLAV_Q is asserted HIGH, the transmitter state machine 460 transitions from the state S0 to the state S1. The transmitter state machine 460 remains in state S0 500 if the P_1 signal is deasserted LOW or the PHY_TXCLAV_Q is deasserted LOW.

In the state S1 510, the TDM_TXSYNC_D signal is on or asserted HIGH, indicating the beginning of a frame sequence. The TDM_TXSYNC_D signal also preloads the byte counter 450 (FIG. 4). Optionally, the TDM_TXCLK_G signal is asserted to enable the gating of the TDM_TXCLK signal. The transmitter state machine 460 stays in the state S1 510 in one clock and transitions to the state S2 520 in the next clock.

In the state S2 520, the TDM_TXSYNC_D signal is off or deasserted LOW because the TDM sync pulse is valid in one clock period only. The transmitter state machine 460 remains in the state S2 520 if the P_1 signal remains LOW. The transmitter state machine 460 transitions from the state S2 520 to the state S3 530 upon an assertion of the P_1 pulse.

In the state S3 530, the PHY_TXSOC_D is on or asserted HIGH and the PHY_TXEN_D# signal is active or asserted LOW. The transmitter state machine 460 remains in the state S3 530 if the P_1 signal remains LOW. The transmitter state machine 460 transitions from the state S3 530 to the state S4 540 upon an assertion of the P_1 pulse.

In the state S4 540, the PHY_TXSOC_D signal is off or deasserted LOW. The transmitter state machine 460 remains in the state S4 540 if the TERM_CNT signal is deasserted LOW or the P_1 signal remains LOW. The transmitter state machine 460 transitions from the state S4 540 to the state S5 550 when the TERM_CNT signal is asserted HIGH and the P_1 signal is asserted HIGH and the PHY_TXCLAV_Q is asserted HIGH. The transmitter state machine 460 transitions from the state S4 540 to the state S7 570 when the TERM_CNT signal is asserted HIGH and the P_1 signal is asserted HIGH and the PHY_TXCLAV_Q is deasserted LOW.

In the state S5 550, the TDM_TXSYNC_D signal is on or asserted HIGH, indicating the beginning of a frame sequence. The TDM_TXSYNC_D signal also preloads the byte counter 450 (FIG. 4). The transmitter state machine 460 stays in the state S5 550 in one clock and transitions to the state S6 560 in the next clock.

In the state S6 560, the TDM_TXSYNC_D signal is off or deasserted LOW because the TDM sync pulse is valid in one clock period only. The transmitter state machine 460 remains in the state S6 560 if the P_1 signal remains LOW. The transmitter state machine 460 transitions from the state S6 560 to the state S3 530 upon an assertion of the P_1 pulse.

In the state S7 570, the optional TDM_TXCLK_G signal is off or deasserted LOW to disable the gating of the TDM_TXCLK signal. The transmitter state machine 460 remains in the state S7 570 if the P_1 signal remains LOW. The transmitter state machine 460 transitions from the state S7 570 to the state S0 500 upon an assertion of the P_1 pulse.

Figure 6A:
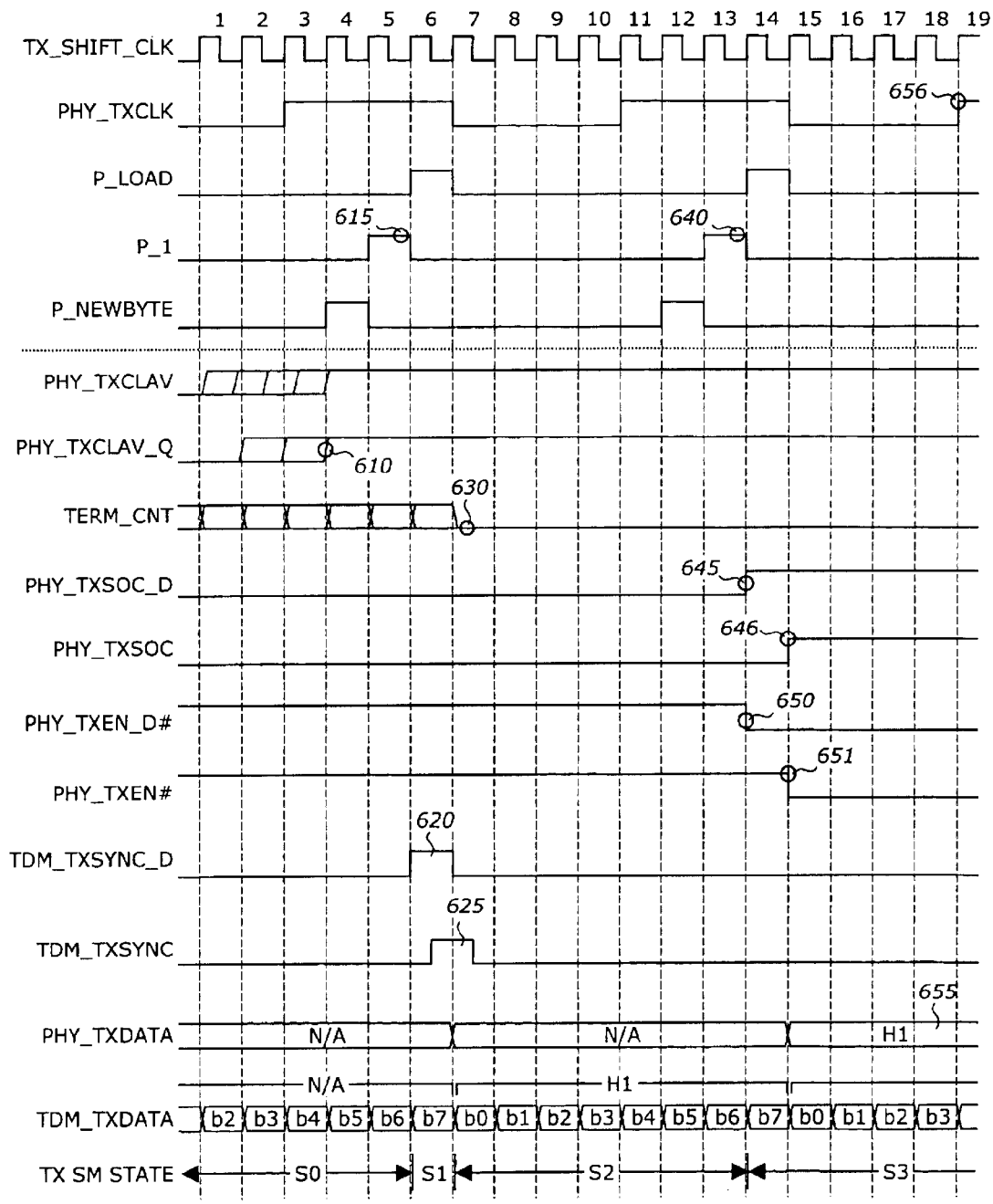
FIG. 6A shows a first portion of a timing diagram for the start of cell transmission.
Figure 6B:
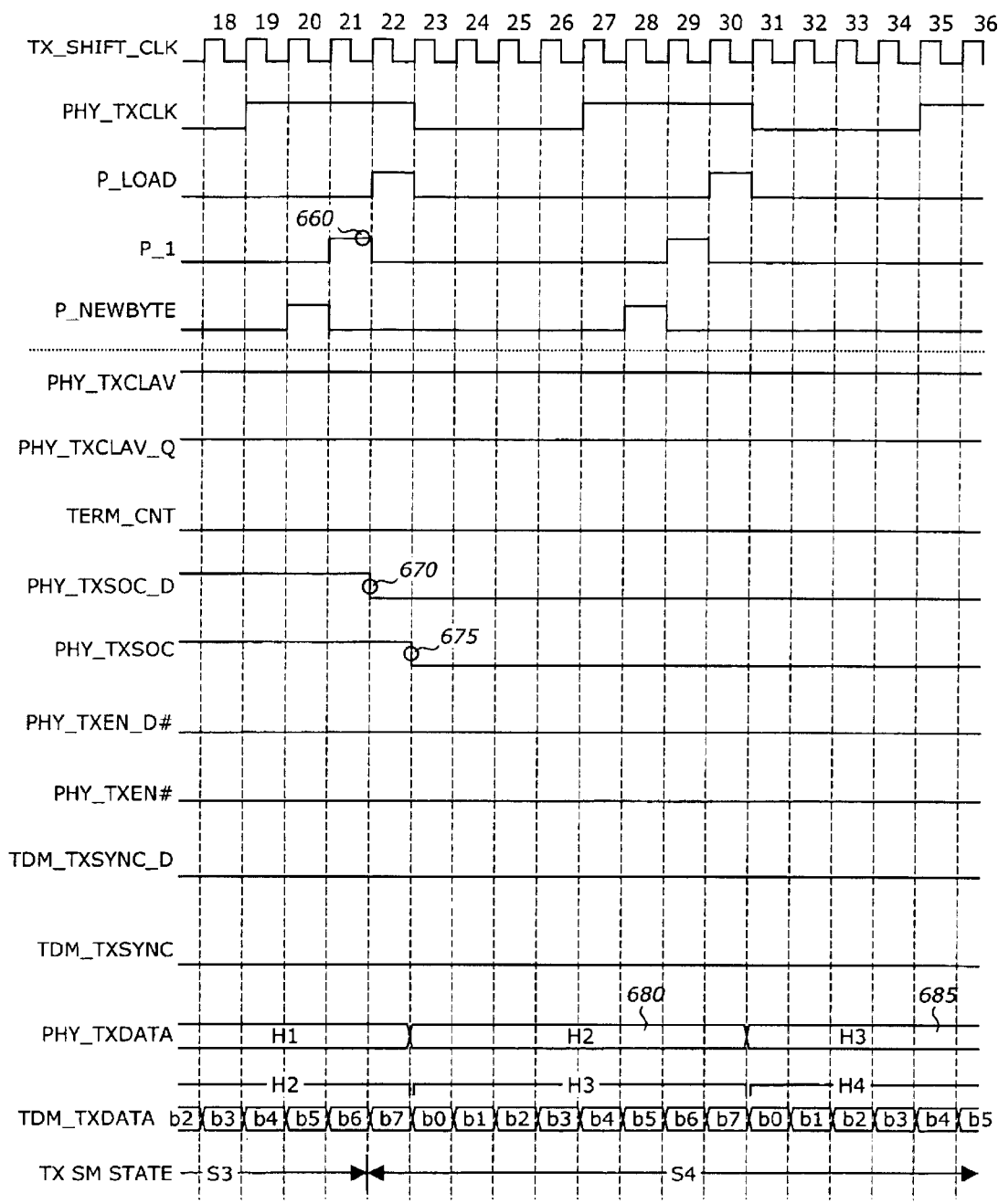
FIG. 6B shows a second portion of a timing diagram for the start of cell transmission.

FIGS. 6A and 6B illustrate the start-of-cell timing sequence according to one embodiment of the invention. The basic timing signal is the TX_SHIFT_CLK signal which is also the TDM_TXCLK if the gating mechanism is disabled. The clock numbers are referenced to the TX_SHIFT_CLK signal. FIG. 6A is a diagram illustrating a first portion of a timing diagram from the TX_SHIFT_CLK numbers 1 through 18 for the start of cell transmission.

The state S0 corresponds to clock #1 through #5. In the state S0, the TDM_TXSYNC_D, the PHY_TXEN_D#, the PHY_TXSOC_D, and optionally the TDM_TXCLK_G are inactive (deasserted). Prior to clock #6, the transmitter state machine is idle, but the PHY_TXCLAV signal becomes asserted and provides the synchronized asserted PHY_TXCLAV_Q 610.

The P_1 pulse is a divide-by-8 from the clock. At the rising clock edge #6, the P_1 pulse is asserted HIGH at 615 while the PHY_TXCLAV_Q is HIGH, causing a state change to S1. This results in an assertion of the TDM_TXSYNC_D pulse 620. The TDM_TXSYNC_D pulse 620 is then clocked out to the TDM_TXSYNC pulse 625 on the ensuing falling edge of clock via signal synchronizer 472 (FIG. 4). Optionally, the TDM_TXCLK_G signal is asserted.

The transmitter state machine then transitions to the state S2. The state S2 corresponds to clock #7 through #13. The TDM_TXSYNC_D pulse 620 in turn pre-loads the byte counter 450 (FIG. 4) on the next clock edge. The TERM_CNT from the byte counter 450 may or may not have been high. In any case, pre-loading will cause the TERM_CNT to be deasserted at 630.

At the next #7 rising edge of clock, a transition to the state S2 occurs which results in the TDM_TXSYNC_D pulse 620 to be deasserted. On the ensuing falling edge of the clock, the TDM_TXSYNC pulse 625 is deasserted. The time slot assignor samples the TDM_TXSYNC pulse 625 and begins the frame (cell) transfer.

At the end of the state S2 in clock #13, the next P_1 pulse 640 occurs, causing a transition to the state S3. The state S3 corresponds to clock #14 through #21 (FIG. 6B). At this point, the 8 bits that have been clocked into the shift register 430 (FIG. 4) are loaded into the PHY_TXDATA signal H1 655. Also, the PHY_TXSOC_D signal 645 and ensuing PHY_TXSOC signal 646 and the PHY_TXEN_D# signal 650 and ensuing PHY_TXEN# 651 are asserted, indicating to the UTOPIA PHY 130 (FIG. 1) that cell transfer is starting. The UTOPIA PHY 130 clocks in data H1 655 on the rising edge of the PHY_TXCLK signal 656.

FIG. 6B is a diagram illustrating a second portion of a timing diagram from the TX_SHIFT_CLK #19 through #36 for the start of cell transmission.

At the end of the state S3, the next P_1 pulse 660 causes a transition to the state S4. The PHY_TXSOC_D signal and the PHY_TXSOC signal are deasserted at 670 and 675, respectively. The transmitter data continue to be transferred such as H2 680 and H3 685, until the TERM_CNT signal is asserted and the P_1 signal is high. This occurs during the final byte transfer of the TDM bus frame.

Figure 7A:
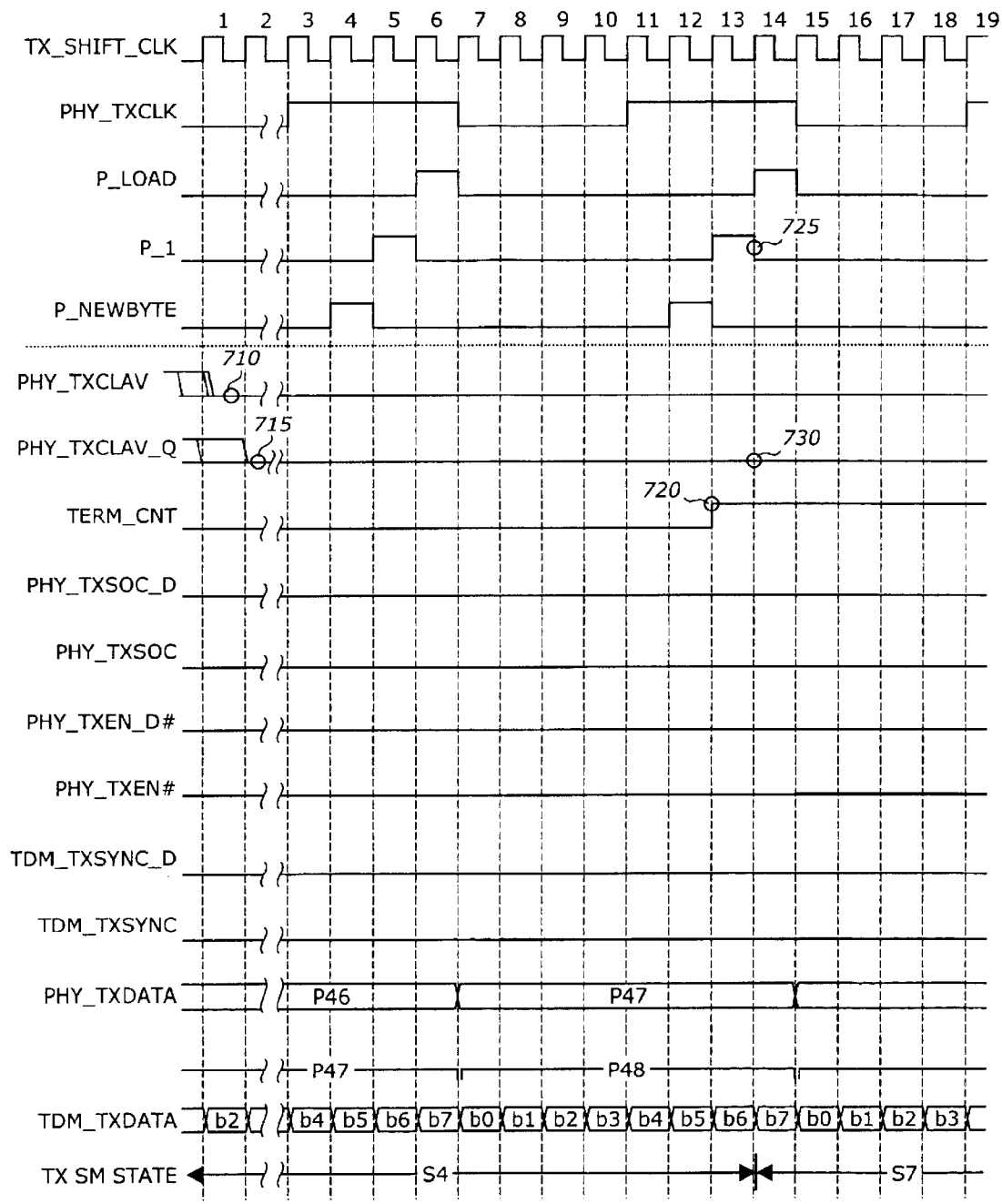
FIG. 7A shows a first portion of a timing diagram for the end of cell transmission.
Figure 7B:
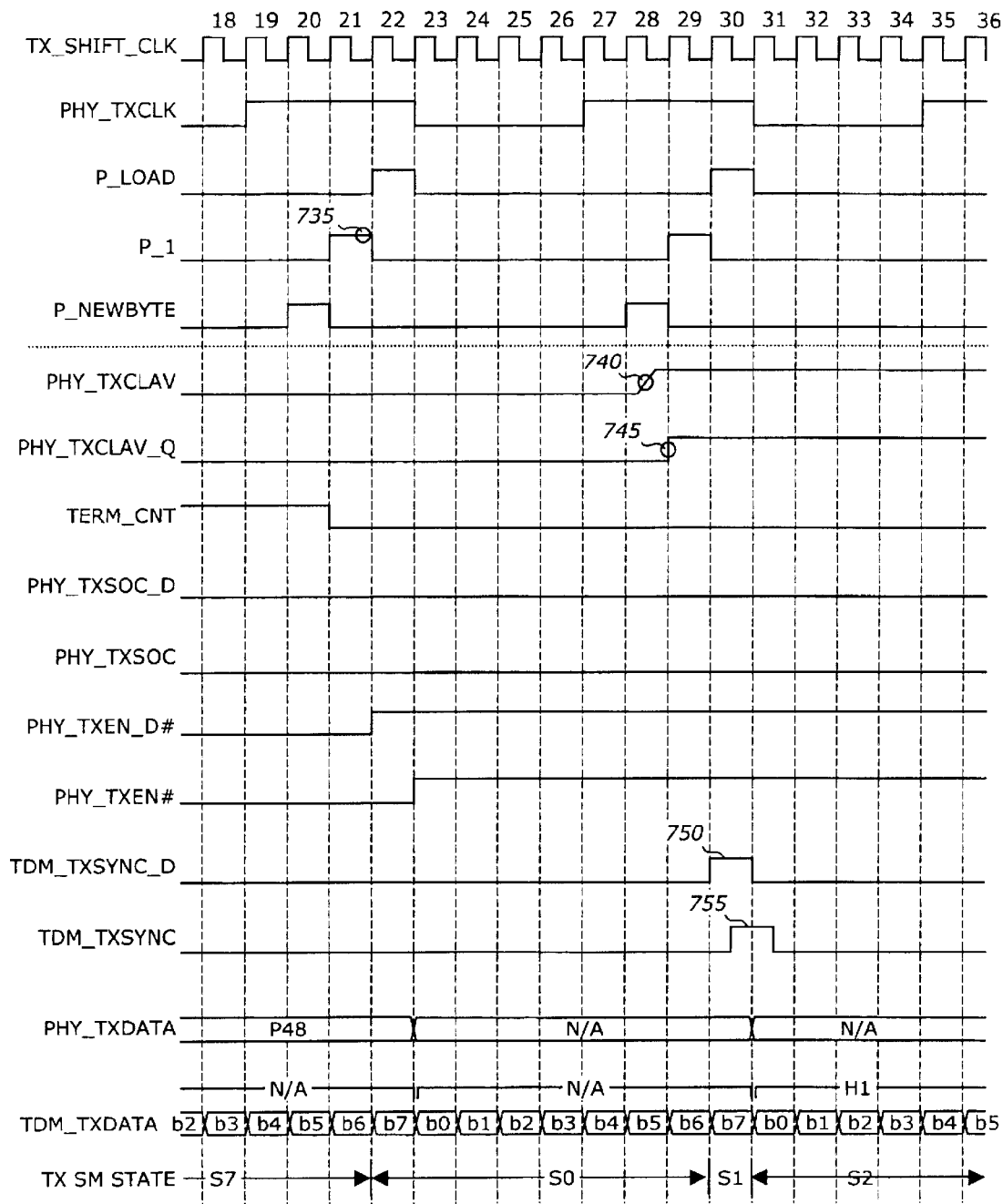
FIG. 7B shows a second portion of a timing diagram for the end of cell transmission.

FIGS. 7A and 7B illustrate a timing diagram for the end of cell transmission according to one embodiment of the invention. The basic timing signal is the TX_SHIFT_CLK signal which is also the TDM_TXCLK if the gating mechanism is disabled. The clock numbers are referenced to the TX_SHIFT_CLK signal. FIG. 7A is a diagram illustrating a first portion of a timing diagram from the TX_SHIFT_CLK #1 through #18 for the end of cell transmission.

During the state S4, the PHY_TXCLAV signal and the PHY_TXCLAV_Q signal are deasserted at 710 and 715, respectively, by the UTOPIA PHY 130 during the final four bytes of a cell, indicating that the UTOPIA PHY 130 cannot accept another cell. At the end of the state S4 at clock #13, during the final byte transfer of the TDM data frame, the TERM_CNT signal from the byte counter 450 (FIG. 4) is asserted at 720. On the following clock edge, the P_1 pulse 725 is asserted. At this time, the PHY_TXCLAV_Q signal is deasserted at 730, indicating that this is the end of cell transmission. The transmitter state machine transitions to the state S7. The state S7 corresponds to clock #14 through #21 (FIG. 7B).

FIG. 7B is a diagram illustrating a second portion of a timing diagram from the TX_SHIFT_CLK #19 through #36 for the end of cell transmission.

The state S7 serves as an additional byte delay until the next P_1 pulse 735 to allow the final byte of the cell to be transferred. At the P_1 pulse 735, the transmitter state machine returns to the idle state S0 at which point it waits to sample the PHY_TXCLAV signal again during P_1 pulse assertions. At clock #28, the PHY_TXCLAV and the PHY_TXCLAV_Q signals are reasserted at 740 and 745, respectively, resulting in re-initiation of the start of cell cycle as indicated by the TDM_TXSYNC_D pulse 750 and the TDM_TXSYNC pulse 755.

Figure 8A:
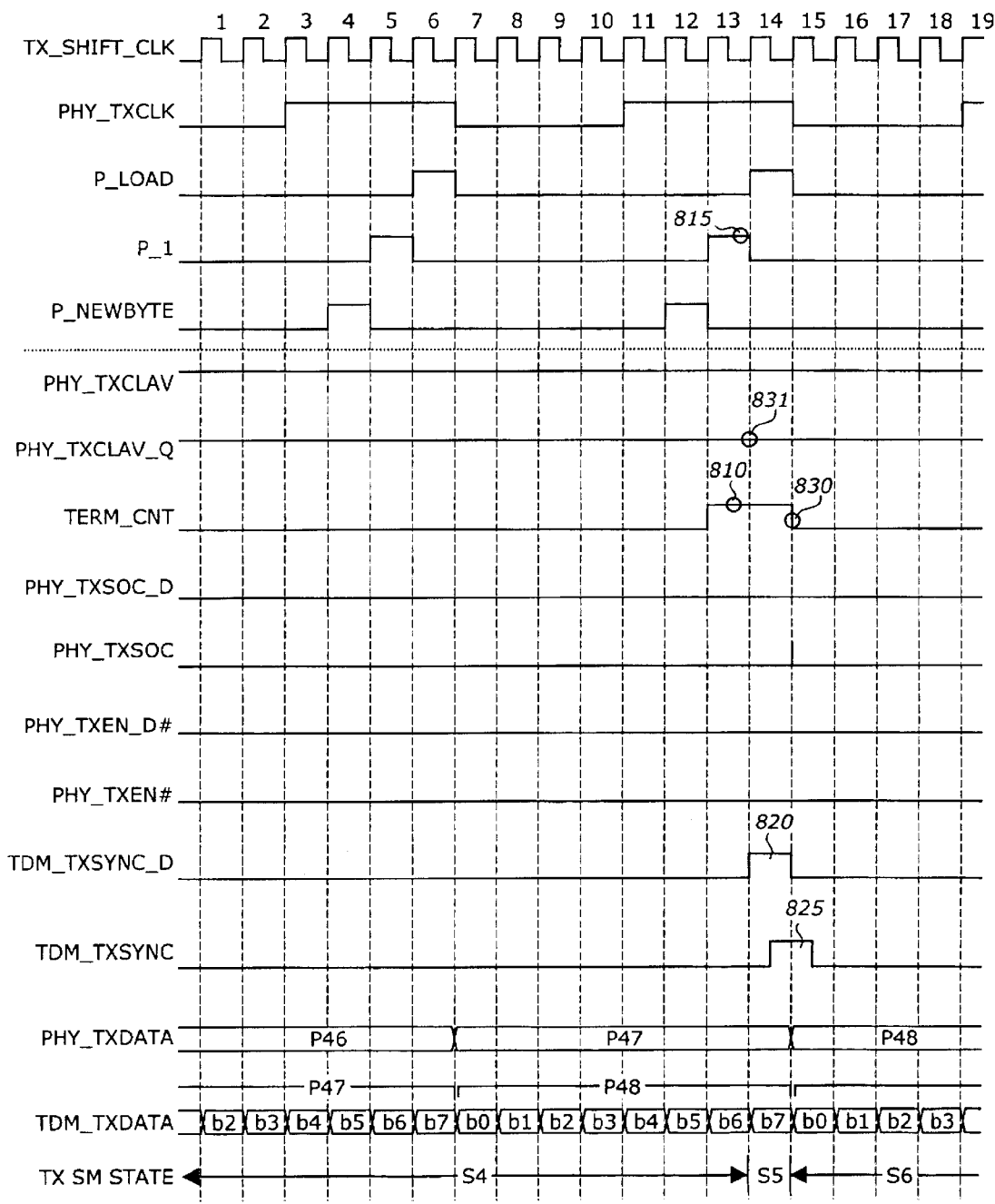
FIG. 8A shows a first portion of a timing diagram for the back-to-back continuous cell transfer.
Figure 8B:
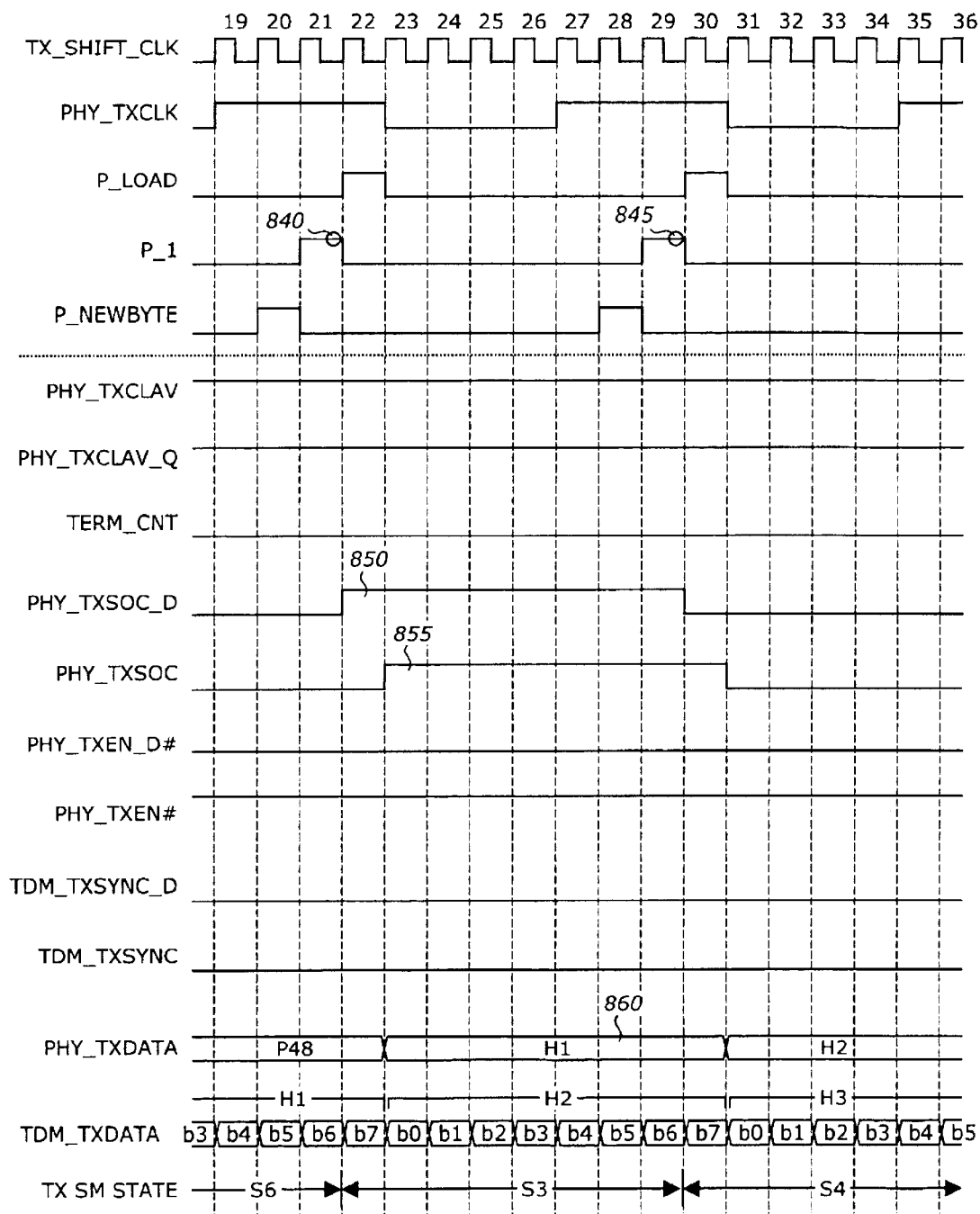
FIG. 8B shows a second portion of a timing diagram for the back-to-back continuous cell transfer transmission.

FIGS. 8A and 8B illustrate a timing diagram for the back-to-back continuous cell transfer transmission according to one embodiment of the invention. The basic timing signal is the TX_SHIFT_CLK signal which is also the TDM_TXCLK if the gating mechanism is disabled. The clock numbers are referenced to the TX_SHIFT_CLK signal. FIG. 8A is a diagram illustrating a first portion of a timing diagram from the clock #1 through #18 for the back-to-back continuous cell transfer transmission.

The assertion of the PHY_TXCLAV signal by the UTOPIA PHY 130 (FIG. 1) during the final four bytes of a cell indicates that it can accept another cell without interruption. While in state S4, during the final byte transfer of the TDM bus frame, the TERM_CNT pulse 810 from the byte counter 450 (FIG. 4) is asserted. On the following clock edge at clock #14, the P_1 pulse 815 is asserted and the PHY_TXCLAV_Q signal 831 is asserted, indicating that the UTOPIA PHY 130 can accept another cell without interruption. The transmitter state machine transitions to the state S5 at clock #14, which is immediately followed by the state S6 beginning at clock #15. The state S5 serves to generate the next TDM_TXSYNC_D pulse 820 and the TDM_TXSYNC pulse 825. Again, assertion of TDM_TXSYNC_D pulse 820 pre-loads the byte counter 450 causing TERM_CNT signal to be deasserted at 830.

FIG. 8B is a diagram illustrating a second portion of a timing diagram from clock #19 through #36 for the back-to-back continuous cell transfer transmission.

While in state 6, the assertion of P_1 pulse 840 at clock #22 causes the transmitter state machine to transition to state S3, followed by the state S4 at the next P_1 pulse 845. During the state S3, the PHY_TXSOC_D and the PHY_TXSOC signals are asserted at 850 and 855, again coinciding with the H1 860 presented to the PHY_TXDATA signal.

A technique has been described to convert the physical layer interface signals to the bus signals and vice versa for the transmission and reception of ATM data. The technique uses cell level handshaking signals to synchronize the data transfer between the physical layer and the bus. The technique provides a reduced pin count for the physical layer interface in interfacing to the bus while maintaining the same level of functionality.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   (a) receiving a downstream clock signal from a physical layer transceiver;
   (b) receiving a cell available signal in a plurality of interface receiver signals from a physical layer interface; and
   (c) generating bus receiver signals to a bus and a plurality of interface receiver signals to the physical layer interface using the downstream clock signal and the cell available signal, the bus receiver signals including a bus receiver sync signal to provide cell alignment.

2. The method of claim 1 wherein the plurality of interface receiver signals further includes a physical layer receiver start of cell signal and physical layer receiver data signals, the physical layer receiver data signals providing N data bits.

3. The method of claim 2 wherein the plurality of interface receiver signals includes a physical layer receiver clock signal and a physical layer receiver enable signal.

4. The method of claim 3 wherein the bus receiver signals further include a bus receiver clock signal, and a bus receiver data signal.

5. The method of claim 4 wherein (c) comprises:
   dividing the downstream clock signal to generate the physical layer receiver clock signal;
   serially shifting the physical layer receiver data signal to generate the bus receiver data signal in a cell transfer; and
   generating the bus receiver sync signal based on the physical layer receiver start of cell signal.

6. The method of claim 4 wherein (c) comprises:
   gating the bus receiver clock signal using the cell available signal.

7. The method of claim 4 wherein (c) comprises:
   generating the physical layer receiver enable signal using control signals.

8. The method of claim 1 wherein the physical layer interface is a Universal Test and Operations physical layer interface for ATM (UTOPIA).

9. The method of claim 1 wherein the bus is a time division multiplexed bus.

10. A method comprising:
    (a) receiving an upstream clock signal from a physical layer transceiver;

(b) receiving one or more bus transmitter signals from a bus and a cell available signal in one or more physical layer transmitter signals from a physical layer interface; and (c) generating a plurality of bus transmitter signals to the bus and a plurality of physical layer transmitter signals to the physical layer interface using the upstream clock signal and the cell available signal, the bus transmitter signals including a bus transmitter sync signal to provide cell alignment.

11. The method of claim 10 wherein the one or more bus transmitter signals includes a bus transmitter data signal.

12. The method of claim 11 wherein the cell available signal is a physical layer transmitter cell available signal.

13. The method of claim 12 wherein the plurality of bus transmitter signals further includes a bus transmitter clock signal.

14. The method of claim 13 wherein the plurality of physical layer transmitter signals includes a physical layer transmitter clock signal, physical layer transmitter data signals, a physical layer transmitter start of cell signal, and a physical layer transmitter enable signal, the physical layer transmitter signals providing multiple data bits simultaneously.

15. The method of claim 14 wherein (c) comprises:
generating a transmitter shift clock signal from the upstream clock signal;
dividing the transmitter shift clock signal to generate physical layer transmitter clock signal;
serially shifting the bus transmitter data signal to generate the physical layer transmitter data signal in a cell transfer; and
generating the bus transmitter sync signal based on the physical layer transmitter cell available signal.

16. The method of claim 15 wherein (c) further comprises:
gating the transmitter shift clock signal to generate the bus transmitter clock signal.

17. The method of claim 15 wherein (c) further comprises:
generating the physical layer transmitter start of cell signal based on the physical layer transmitter cell available signal to indicate start of the cell transfer;
generating the physical layer transmitter enable signal during the cell transfer; and
generating a terminal count signal based on a cell size to indicate end of the cell transfer.

18. The method of claim 10 wherein the physical layer interface is a Universal Test and Operations physical layer interface for ATM (UTOPIA).

19. The method of claim 10 wherein the bus is a time division multiplexed bus.

20. An apparatus comprising:
(a) a clock and timing generator to receive a downstream clock signal from a physical layer transceiver;
(b) a circuit coupled to the clock and timing generator to receive a cell available signal in a plurality of interface receiver signals from a physical layer interface, the circuit generating bus receiver signals to a bus and a plurality of interface receiver signals to the physical layer interface using the downstream clock signal and the cell available signal, the bus receiver signals including a bus receiver sync signal to provide cell alignment.

21. The apparatus of claim 20 wherein the plurality of interface receiver signals further includes a physical layer receiver start of cell signal and physical layer receiver data signals, the physical layer receiver data signals providing multiple data bits simultaneously.

22. The apparatus of claim 21 wherein the plurality of interface receiver signals includes a physical layer receiver clock signal and a physical layer receiver enable signal.

23. The apparatus of claim 22 wherein the bus receiver signals further include a bus receiver clock signal, and a bus receiver data signal.

24. The apparatus of claim 23 wherein the clock and timing generator comprises:
a divider for dividing the downstream clock signal to generate the physical layer receiver clock signal.

25. The apparatus of claim 24 wherein the circuit comprises:
a shifter coupled to the clock and timing generator for serially shifting the physical layer receiver data signal to generate the bus receiver data signal in a cell transfer; and
a sync generator coupled to the clock and timing generator for generating the bus receiver sync signal based on the physical layer receiver start of cell signal.

26. The apparatus of claim 24 wherein the clock and timing generator comprises:
a gate control circuit for gating the bus receiver clock signal using the cell available signal.

27. The apparatus of claim 25 wherein the circuit further comprises:
an enable controller for generating the physical layer receiver enable signal using a control signal.

28. The apparatus of claim 20 wherein the physical layer interface is a Universal Test and Operations physical layer interface for ATM (UTOPIA).

29. The apparatus of claim 20 wherein the bus is a time division multiplexed bus.

30. An apparatus comprising:
(a) a clock and timing generator to receive an upstream clock signal from a physical layer transceiver; and
(b) a circuit coupled to the clock and timing generator to receive one or more bus transmitter signals from a bus and a cell available signal in one or more physical layer transmitter signals from the physical layer interface, the circuit generating a plurality of bus transmitter signals to the bus and a plurality of physical layer transmitter signals to the physical layer interface using the upstream clock signal and the cell available signal, the bus transmitter signals including a bus transmitter sync signal to provide cell alignment.

31. The apparatus of claim 30 wherein the one or more bus transmitter signals includes a bus transmitter data signal.

32. The apparatus of claim 31 wherein the cell available signal is a physical layer transmitter cell available signal.

33. The apparatus of claim 32 wherein the plurality of bus transmitter signals further includes a bus transmitter clock signal.

34. The apparatus of claim 31 wherein the plurality of physical layer transmitter signals includes a physical layer transmitter clock signal, physical layer transmitter data signals, a physical layer transmitter start of cell signal, and a physical layer transmitter enable signal, the physical layer transmitter data signals providing N data bits.

35. The apparatus of claim 34 wherein the clock and timing generator comprises:
a clock generator for generating a transmitter shift clock signal from the upstream clock signal.

36. The apparatus of claim 35 wherein the circuit comprises:

a shift register for serially shifting the bus transmitter data signal to generate the physical layer transmitter data signal in a cell transfer;

a clock/pulse engine coupled to the shift register for dividing the transmitter shift clock signal to generate physical layer transmitter clock signal; and a transmitter state machine for generating the bus transmitter sync signal based on the physical layer transmitter cell available signal.

37. The apparatus of claim 36 wherein the clock and timing generator further comprises:

a gate control circuit coupled to the clock generator for gating the transmitter shift clock signal to generate the bus transmitter clock signal.

38. The apparatus of claim 36 wherein the transmitter state machine generates the physical layer transmitter start of cell signal based on the bus transmitter signal to indicate start of the cell, the physical layer transmitter enable signal during the cell transfer, and a terminal count signal based on a cell size to indicate end of the cell transfer.

39. The apparatus of claim 30 wherein the physical layer interface is a Universal Test and Operations physical layer interface for ATM (UTOPIA).

40. The apparatus of claim 30 wherein the bus is a time division multiplexed bus.

41. A system comprising:

a physical layer interface;

a bus having a bus interface circuit; and a physical-to-bus interface circuit coupled to the physical layer interface and the bus interface circuit, the physical-to-bus interface circuit comprising:

(a) a clock and timing generator to receive a downstream clock signal from a physical layer transceiver, and (b) a circuit coupled to the clock and timing generator to receive a cell available signal in a plurality of interface receiver signals from the physical layer interface, the circuit generating bus receiver signals to the bus and a plurality of interface receiver signals to the physical layer interface using the downstream clock signal and the cell available signal, the bus receiver signals including a bus receiver sync signal to provide cell alignment.

42. The system of claim 41 wherein the plurality of interface receiver signals further includes a physical layer receiver start of cell signal and physical layer receiver data signals, the physical layer receiver data signals providing N data bits.

43. The system of claim 42 wherein the plurality of interface receiver signals includes a physical layer receiver clock signal and a physical layer receiver enable signal.

44. The system of claim 41 wherein the bus receiver signals further include a bus receiver clock signal, and a bus receiver data signal.

45. The system of claim 41 wherein the physical layer interface is a Universal Test and Operations physical layer interface for ATM (UTOPIA).

46. The system of claim 41 wherein the bus is a time division multiplexed bus.

47. A system comprising:

a physical layer interface;

a bus having a bus interface circuit; and a physical-to-bus interface circuit coupled to the physical layer interface and the bus interface circuit, the physical-to-bus interface circuit comprising:

(a) a clock and timing generator to receive an upstream clock signal from a physical layer transceiver, and (b) a circuit coupled to the clock and timing generator to receive one or more bus transmitter signals from the bus and a cell available signal in one or more physical layer transmitter signals from the physical layer interface, the circuit generating a plurality of bus transmitter signals to the bus and a plurality of physical layer transmitter signals to the physical layer interface using the upstream clock signal and the cell available signal, the bus transmitter signals including a bus transmitter sync signal to provide cell alignment.

48. The system of claim 47 wherein the one or more bus transmitter signals includes a bus transmitter data signal.

49. The system of claim 48 wherein the cell available signal is a physical layer transmitter cell available signal.

50. The system of claim 49 wherein the plurality of bus transmitter signals further includes a bus transmitter clock signal.

51. The system of claim 50 wherein the plurality of physical layer transmitter signals includes a physical layer transmitter clock signal, physical layer transmitter data signals, a physical layer transmitter start of cell signal, and a physical layer transmitter enable signal, the physical layer transmitter data signals providing N data bits.

52. The system of claim 47 wherein the physical layer interface is a Universal Test and Operations physical layer interface for ATM (UTOPIA).

53. The system of claim 47 wherein the bus is a time division multiplexed bus.

54. An apparatus comprising:

(a) a timing means for receiving a downstream clock signal from a physical layer transceiver;

(b) a circuit means coupled to the clocking means for receiving a cell available signal in a plurality of interface receiver signals from a physical layer interface, the circuit means generating bus receiver signals to a bus and a plurality of interface receiver signals to the physical layer interface using the downstream clock signal and the cell available signal, the bus receiver signals including a bus receiver sync signal to provide cell alignment.

55. The apparatus of claim 54 wherein the plurality of interface receiver signals further includes a physical layer receiver start of cell signal and physical layer receiver data signals, the physical layer receiver data signals providing multiple data bits simultaneously.

56. The apparatus of claim 55 wherein the plurality of interface receiver signals includes a physical layer receiver clock signal and a physical layer receiver enable signal.

57. The apparatus of claim 56 wherein the bus receiver signals further include a bus receiver clock signal, and a bus receiver data signal.

58. The apparatus of claim 57 wherein the timing means comprises:

a dividing means for dividing the downstream clock signal to generate the physical layer receiver clock signal.

59. The apparatus of claim 58 wherein the circuit means comprises:

a shifting means coupled to the clocking means for serially shifting the physical layer receiver data signal to generate the bus receiver data signal in a cell transfer; and a sync means coupled to the clocking means for generating the bus receiver sync signal based on the physical layer receiver start of cell signal.

60. The apparatus of claim 58 wherein the timing means comprises:
a gating means for gating the bus receiver clock signal using the cell available signal.

61. The apparatus of claim 59 wherein the circuit means further comprises:
an enabling means for generating the physical layer receiver enable signal using a control signal.

62. The apparatus of claim 54 wherein the physical layer interface is a Universal Test and Operations physical layer interface for ATM (UTOPIA).

63. The apparatus of claim 54 wherein the bus is a time division multiplexed bus.

64. An apparatus comprising:
(a) a timing means for receiving an upstream clock signal from a physical layer transceiver; and
(b) a circuit means coupled to the clocking means for receiving one or more bus transmitter signals from a bus and a cell available signal in one or more physical layer transmitter signals from the physical layer interface, the circuit means generating a plurality of bus transmitter signals to the bus and a plurality of physical layer transmitter signals to the physical layer interface using the upstream clock signal and the cell available signal, the bus transmitter signals including a bus transmitter sync signal to provide cell alignment.

65. The apparatus of claim 64 wherein the one or more bus transmitter signals includes a bus transmitter data signal.

66. The apparatus of claim 65 wherein the cell available signal is a physical layer transmitter cell available signal.

67. The apparatus of claim 66 wherein the plurality of bus transmitter signals further includes a bus transmitter clock signal.

68. The apparatus of claim 65 wherein the plurality of physical layer transmitter signals includes a physical layer transmitter clock signal, physical layer transmitter data signals, a physical layer transmitter start of cell signal, and a physical layer transmitter enable signal, the physical layer transmitter data signals providing N data bits.

69. The apparatus of claim 68 wherein the timing means comprises:
a clocking means for generating a transmitter shift clock signal from the upstream clock signal.

70. The apparatus of claim 69 wherein the circuit means comprises:
a shifting means for serially shifting the bus transmitter data signal to generate the physical layer transmitter data signal in a cell transfer;
a dividing means coupled to the shifting means for dividing the transmitter shift clock signal to generate physical layer transmitter clock signal; and
a state machine means for generating the bus transmitter sync signal based on the physical layer transmitter cell available signal.

71. The apparatus of claim 70 wherein the timing means further comprises:
a gating means coupled to the clocking means for gating the transmitter shift clock signal to generate the bus transmitter clock signal.

72. The apparatus of claim 69 wherein the state machine means generates the physical layer transmitter start of cell signal based on the bus transmitter signal to indicate start of the cell, the physical layer transmitter enable signal during the cell transfer, and a terminal count signal based on a cell size to indicate end of the cell transfer.

73. The apparatus of claim 64 wherein the physical layer interface is a Universal Test and Operations physical layer interface for ATM (UTOPIA).

74. The apparatus of claim 64 wherein the bus is a time division multiplexed bus.

* * * * *